United States Patent [19]

Bobba et al.

[11] Patent Number: 5,007,691
[45] Date of Patent: Apr. 16, 1991

[54] METHOD AND APPARATUS FOR BEAM SWEEPING IN A LASER SCANNER

[75] Inventors: Mohan L. Bobba; Howard H. Nojiri, both of Eugene, Oreg.

[73] Assignee: Spectra-Physics, Inc., San Jose, Calif.

[21] Appl. No.: 398,920

[22] Filed: Aug. 28, 1989

[51] Int. Cl.⁵ .......................................... G02B 26/08
[52] U.S. Cl. ................................. 350/6.7; 350/6.5; 350/484
[58] Field of Search ............... 350/6.1, 6.2, 6.3, 6.4, 350/6.5, 6.6, 6.7, 6.8, 6.9, 6.91, 3.71, 484, 486; 346/160; 250/234–236

[56] References Cited

U.S. PATENT DOCUMENTS 4,800,270 1/1989 Blais .................................... 350/6.6

FOREIGN PATENT DOCUMENTS 0038723 3/1984 Japan .................................. 350/6.8
0038724 3/1984 Japan .................................. 350/6.8
0104619 6/1984 Japan .................................. 350/6.8

Primary Examiner—Bruce Y. Arnold
Assistant Examiner—James Phan
Attorney, Agent, or Firm—Killworth, Gottman, Hagan & Schaeff

[57] ABSTRACT

A method and apparatus for sweeping a laser beam in a laser scanner is disclosed wherein a laser beam traveling along a path from a laser beam source is directed upon a scanner mirror which reflects the beam into scan pattern mirrors to project a scanning pattern for each sweep of the laser beam. A rotary actuator supports and rotates the scanner mirror to sweep the laser beam onto the scan pattern mirrors and a linear actuator in turn supports and linearly moves the rotary actuator and scanner mirror generally along the path of the laser beam to vary the point of focus of the laser beam and thereby expand the effective depth of field of the laser scanner.

18 Claims, 3 Drawing Sheets

METHOD AND APPARATUS FOR BEAM SWEEPING IN A LASER SCANNER

BACKGROUND OF THE INVENTION

The present invention relates generally to laser scanners and, more particularly, to a method and apparatus for sweeping a laser beam in a laser scanner to vary the point of focus of the laser beam such that the depth of field of the scanner is effectively expanded.

Laser scanners for use at point-of-sale checkout counters in supermarkets and other retail stores are becoming more and more common as the reliability of scanners increases and their costs decrease. The scanners are generally mounted within the checkout counters and have upwardly facing windows through which laser beams are projected in defined scanning patterns. A scanning pattern is created by a laser and associated optical components which produce a plurality of intersecting scan lines to define the pattern. A bar coded label including for example a UPC, EAN, JAN or any other code on the packaging of a product presented at a counter is passed through the field of view or scan volume of a laser scanner. Light reflected from the bar coded label is received back through the scanner window and processed to provide identification of the product and pricing information for the sale and other retailing applications such as inventory control.

The depth of field of existing laser scanners, with the exception of holographic scanners, is fixed for any given scan geometry such that the read rate of the scanner is reduced as labels within the field of view are moved from the point of focus of the scanned laser beam. While holographic scanners have variable depth of field and accordingly a substantially uniform read rate throughout the scan volume, holographic scanners are substantially more expensive than other scanners due to the cost of a required holographic element.

It is thus perceived that a need exists for an improved laser scanner having an increased scan volume and a high read rate which is substantially uniform throughout the scan volume comparable to a holographic scanner but at reduced cost to further the utility of laser scanners by continuing the trend of higher performance and lower costs.

SUMMARY OF THE INVENTION

This need is met by the method and apparatus of the present application for sweeping a laser beam in a laser scanner to vary the point of focus of the laser beam and accordingly the depth of field such that the depth of field of the scanner is effectively expanded. In a laser scanner incorporating the present invention, a scanner mirror which is rotated or pivoted to sweep a laser beam for projecting a scan pattern of laser light, is linearly moved generally along a path defined by the laser beam. This linear movement of the scanner mirror changes the optical path of the laser beam within the laser scanner such that the point of focus of the laser beam moves relative to a scan window of the laser scanner to sweep the point of focus through a defined space beyond or typically above the scan window such that the field of view of the scanner is also swept through a corresponding but larger defined space beyond or typically above the scan window. The scanning speed and speed of linear movement of the scanner mirror are selected and preferably synchronized such that the effective field of view or scan volume of the laser scanner is expanded.

In accordance with one aspect of the present invention, beam sweeping apparatus for use in a laser scanner to receive a laser beam traveling along a path from a laser beam generating means and to sweep the laser beam onto reflecting means which projects a scanning pattern for each sweep of the laser beam comprises mirror means for receiving and directing the laser beam onto the reflecting means. Rotary drive means provide for supporting and rotating the mirror means to sweep the laser beam onto the reflecting means. Linear drive means in turn provide for supporting and linearly moving the rotary drive means generally along the path of the laser beam to vary the point of focus of the laser beam and thereby expand the effective depth of field of the laser scanner.

The mirror means may comprise a multi-faceted mirror head in which case the rotary drive means comprises a motor having a rotatable output shaft for supporting the mirror head. The linear drive means may comprise a base defining at least one linear guide member, an electrical coil supported upon the base and having a central axis spaced in parallel from the guide member, and a plunger supporting at least one permanent magnet and surrounding the coil, the plunger being supported for linear movement along the at least one linear guide member. The linear drive means may further comprise resilient means supported upon the at least one linear guide member for biasing the plunger to a linear home position relative to the at least one linear guide member. The resilient means may comprise at least one pair of compression springs positioned on opposite sides of the plunger. The operation of the linear drive means and the motor are preferably synchronized to minimize variations in the point of focus of the laser beam and the scan geometry of the laser scanner during each sweep of the laser beam.

Alternately, the mirror means may comprise at least one mirror surface and the rotary drive means then comprises a reciprocally pivoting rotary actuator. The rotary actuator may comprise a core shaft extending from the linear actuator, an electrical coil wound around the core shaft, a cylindrical body surrounding the coil and supporting the mirror means and at least one permanent magnet operable with the coil, and bearing means for freely rotatably supporting the cylindrical body on the core shaft. The beam sweeping apparatus may further comprise resilient means for biasing the cylindrical body to a rotary home position relative to the core shaft. The resilient means may comprise a torsion spring coupled between the cylindrical body and the core shaft.

In accordance with another aspect of the present invention, a method of operating a laser scanner wherein a laser beam is directed along a path upon a scanner mirror which sweeps the beam onto reflecting means to project a scanning pattern for each sweep of the beam comprises the steps of mounting the scanner mirror on a linear drive system, and linearly moving the scanner mirror generally along the path of the laser beam to vary the point of focus of the laser beam and thereby expand the effective depth of field of the laser scanner. The method may further comprise the step of resiliently biasing the scanner mirror to a linear home position along the linear drive system.

The scanner mirror may be mounted upon a rotary drive system for rotating the scanner mirror to sweep the laser beam onto the reflecting means and the method may further comprise the steps of reciprocally pivoting the scanner mirror, and resiliently biasing the scanner mirror to a home position on the rotary drive system. Preferably, the method further comprises the step of synchronously operating the pivotal movement of the scanner mirror with the linear movement of the scanner mirror to minimize variations in the point of focus of the laser beam and the scan geometry of the laser scanner during each sweep of the laser beam.

It is an object of the present invention to provide a method and apparatus for sweeping a laser beam in a laser scanner to vary the point of focus of the laser beam such that the depth of field of the scanner is effectively expanded; to provide a method and apparatus for sweeping a laser beam in a laser scanner to vary the point of focus of the laser beam by linearly moving a pivoting or rotating scanner mirror along a path defined by the laser beam such that the depth of field of the scanner is effectively expanded; and, to provide a method and apparatus for sweeping a laser beam in a laser scanner to vary the point of focus of the laser beam by linearly moving a pivoting or rotating scanner mirror along a path defined by the laser beam such that the depth of field of the scanner is effectively expanded wherein the linear movement and the pivoting or rotating movement are synchronized to minimize variations in the point of focus of the laser beam and the scan geometry of the laser scanner during each sweep of the laser beam.

Other objects and advantages of the invention will be apparent from the following description, the accompanying drawings and the appended claims.

DETAILED DESCRIPTION OF THE PRESENT INVENTION

Figure 1:
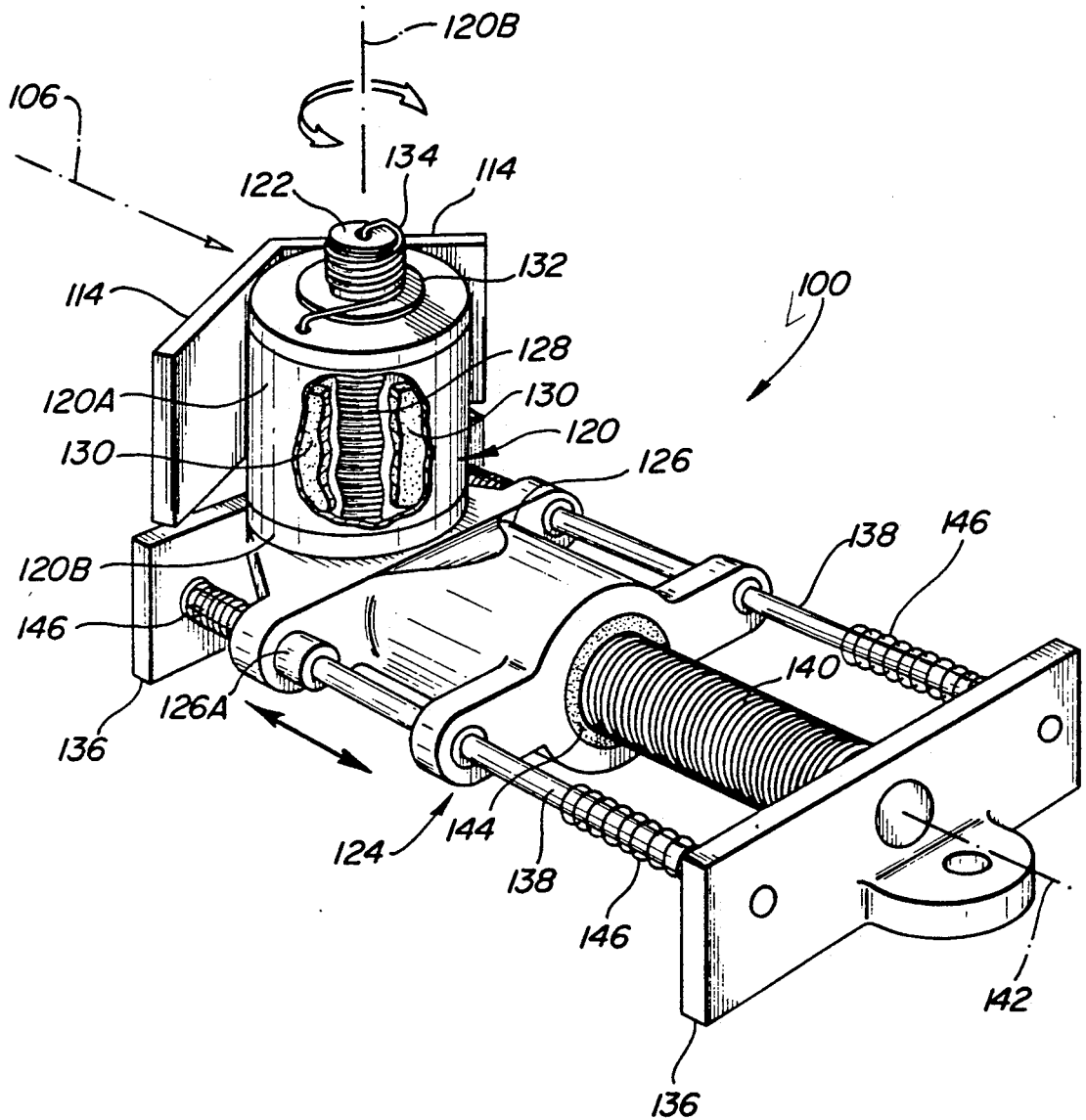
FIG. 1 is a perspective view of a first embodiment of beam sweeping apparatus in accordance with the present invention for use in a laser scanner to vary the point of focus of a scanned laser beam and thereby expand the effective depth of field of the laser scanner.
Figure 2:
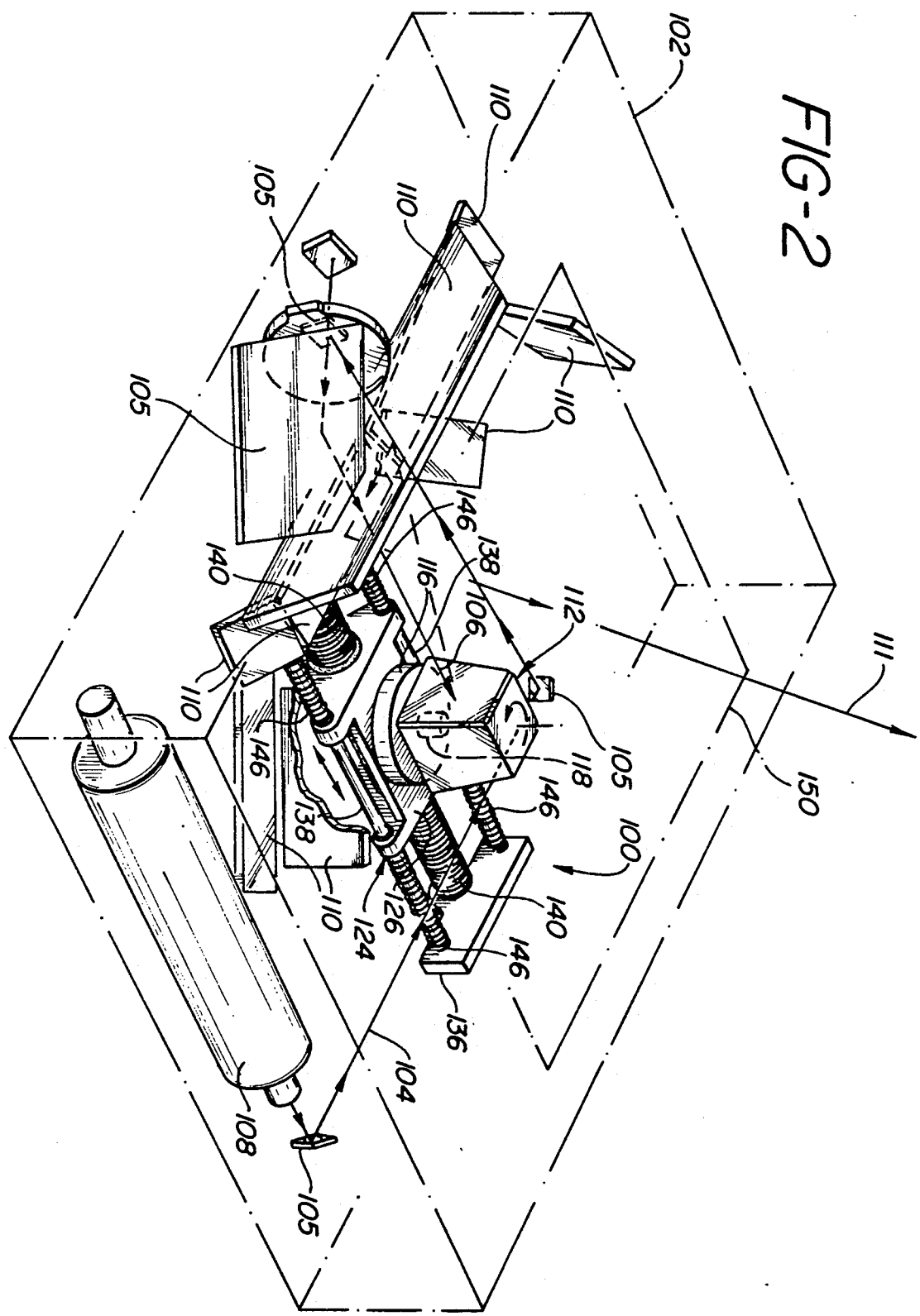
FIG. 2 is a perspective view of a second embodiment of beam sweeping apparatus in accordance with the present invention for use in a laser scanner having a rotating, multi-faceted beam sweeping element or mirror head.

FIGS. 1 and 2 are perspective views of two embodiments of beam sweeping apparatus 100 operable in accordance with the present invention. The first embodiment of FIG. 1 is shown separate and apart from a laser scanner in which it is utilized to more clearly illustrate the structure of the beam sweeping apparatus while the second embodiment of FIG. 2 is shown installed in a laser scanner 102 to better illustrate the operating orientation and positioning of the beam sweeping apparatus 100 within the laser scanner 102.

The beam sweeping apparatus 100 receives a laser beam 104 from beam directing mirrors 105 which define a beam path 106 from a laser beam generating means or laser source 108, such as a helium neon laser, to the beam sweeping apparatus 100. The laser beam 104 is then swept onto reflecting means or mirrors 110 which in turn project a scanning pattern for each sweep of the laser beam 104, a single beam 111 of a scanning pattern being shown in FIG. 2. For additional information about the scanner 102, the reader is referred to U.S. Pat. No. 4,861,973 which is assigned to the same assignee as the present application and is incorporated herein by reference. The beam sweeping apparatus 100 includes mirror means which comprises at least one mirror surface in the first embodiment of FIG. 1 and a multi-faceted mirror head 112 in the second embodiment of FIG. 2. Two mirror surfaces 114 are illustrated in FIG. 1, of course any reasonable number of mirror surfaces can be used with the number of mirror surfaces depending on the sweep angle required to create a desired scan geometry and the size of the mirror surfaces or facets required for a given collection light cone.

Rotary drive means are provided for supporting and rotating the mirror means to sweep the laser beam 104 onto the mirrors 110 or other beam reflecting means. The rotary drive means comprises a motor 116 having a rotatable output shaft 118 for supporting and rotating the multi-faceted mirror head 112 of FIG. 2. In FIG. 1, the rotary drive means comprises a reciprocally pivoting rotary actuator 120. The rotary actuator 120 comprises a core shaft 122 extending from a linear actuator 124, the core shaft 122 may be integrally formed as a portion of a plunger 126 of the linear actuator 124 or otherwise be secured thereto. A portion of a cylindrical outer body 120A of the reciprocally pivoting rotary actuator 120 is cut away in layers in FIG. 1 to reveal an electrical coil 128 wound around the core shaft 122 within the outer body 120A.

The outer cylindrical body 120A surrounding the coil 128 and supporting the mirror surfaces 114 houses at least one permanent magnet 130 operable with a magnetic field generated when the coil 130 is activated to rotate or pivot the outer cylindrical body 120A. Bearing means comprising ball bearings 132 or other appropriate bearings are provided for freely rotatably supporting the outer cylindrical body 120A of the rotary actuator 120 on the core shaft 122.

Resilient means comprising a torsion spring 134 coupled between the outer cylindrical body 120A and the core shaft 122 provide for biasing the outer cylindrical body 120A to a rotary home position relative to the core shaft 122. The torsion spring 134 stores energy as the body 120A and hence the mirror surfaces 114 are rotated from the rotary home position. The rotary actuator 120 pivotally oscillates the mirror surfaces 114 about the axis 120B of the rotary actuator 120. The natural frequency of the rotary actuator 120 is selected to be close to its operating frequency and the energy stored in the spring 134 helps to accelerate the body 120A such that the power needed to oscillate the rotary actuator is reduced.

Linear drive means comprising the linear actuator 124 provides for supporting and linearly moving the rotary drive means generally along the path 106 of the laser beam 104 to vary the point of focus of the laser beam 104 and thereby expand the effective depth of field of the laser scanner 102. As best shown in FIG. 1, the linear actuator 124 comprises a base defined by end plates 136 and linear guide members 138 which extend therebetween. An electrical coil 140 is supported upon the base, extending between the end plates 136 and having a central axis 142 spaced in parallel from the guide members 138. The plunger 126 supports at least one permanent magnet 144, surrounds the coil 140 and is supported for linear movement along the linear guide members 138. Resilient means comprising compression springs 146 are positioned on opposite sides of the plunger 126 and supported upon the linear guide members 138 for biasing the plunger 126 to a generally centered linear home position relative to the linear guide members 138.

The laser beam 104 traveling along the path 106 strikes the mirror means and is swept to the mirrors 110 from which the beam 104 is projected through a window 150 of the scanner 102, see FIG. 2, in a defined scan pattern. Preferably, the motion of the rotary drive means is such that an integral number of scan patterns are generated while the linear drive means is substantially stationary. In this way, the point of focus remains in substantially the same place throughout the scan pattern(s) and correspondingly the depth of field of the scanner extends from that point of focus. The point of focus and corresponding positioning of the depth of field can be increased and decreased by activating the linear drive means to move the rotary drive means toward or away from the source of the laser beam 104, respectively, along the beam path 106.

Figure 3:
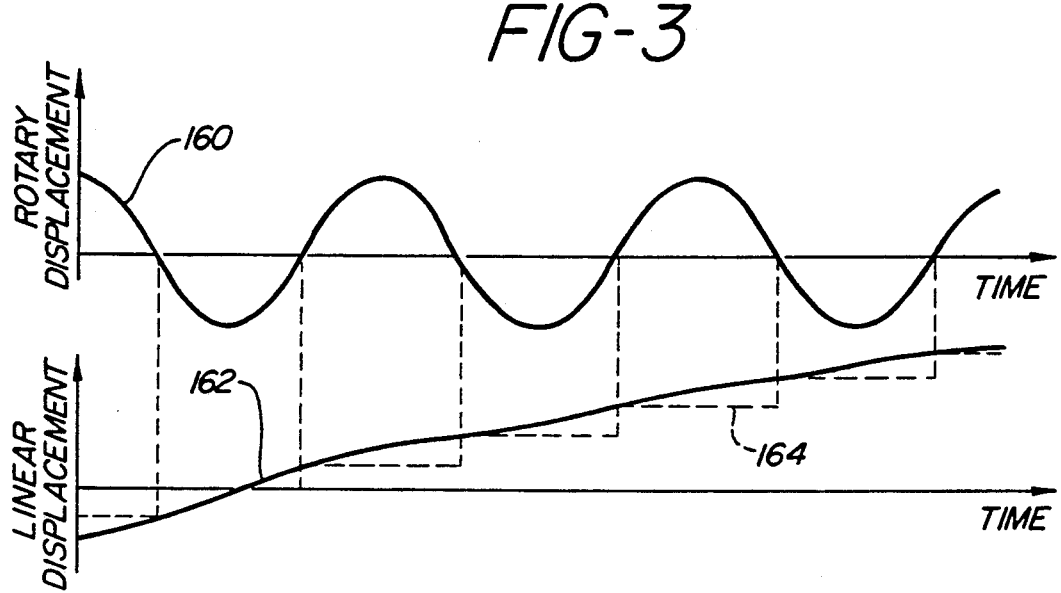
FIG. 3 is a chart illustrating rotary and linear movement of the beam sweeping apparatus and the synchronization of those movements to minimize variations in the point of focus of the laser beam and the scan geometry of the laser scanner during each sweep of the beam.

FIG. 3 is a chart illustrating the rotary displacement 160 and the linear displacement 162 of the moving elements within the beam scanning apparatus as previously described. The displacements 160, 162 may also be considered as representative of drive signals which are applied to the rotary drive means and the linear drive means, repectively. From FIG. 3, it should be apparent that the frequency of the rotary movement is substantially higher than the frequency of the linear movement with the ratio being approximately 10 to 1. It has been determined that a rotary movement frequency of approximately between 150-300 hertz and a linear movement frequency of approximately between 15-30 hertz provides satisfactory results in accordance with a scan time of approximately 1.5 seconds per item scanned. The different movement frequencies are necessary to minimize variations of the location of the point of focus, corresponding depth of field and possibly even the scan geometry of the laser scanner within a given scan line or scan lines of one or more scan patterns. The scan geometry variations can also be minimized by setting the incident angle of the laser beam on the mirror means as close as possible to 90° such that the incident angle is minimally changed by the linear movement of the mirror means within the beam sweeping apparatus.

While the noted movement frequency differences provide satisfactory operation for many applications, it is desirable and oftentimes preferred to synchronize the rotary movement of the rotary drive means with the linear movement of the linear drive means. Also, the drive to the linear drive means or actuator may be a stepped function 164 which correspondingly moves the linear actuator in steps to thereby better maintain the location of the point of focus of the laser beam and the scan geometry throughout one or more scan lines of one or more scan patterns. As shown in FIG. 3, the rotary and linear displacements are synchronized such that the linear positioning of the pivoting rotary actuator 120 and hence the mirror surfaces 114 remain substantially in the same position throughout a half cycle of the rotary motion. The rotary actuator 120 needs to complete at least one half cycle or multiples of half cycles for each increment of the linear actuator 124.

Figure 4:
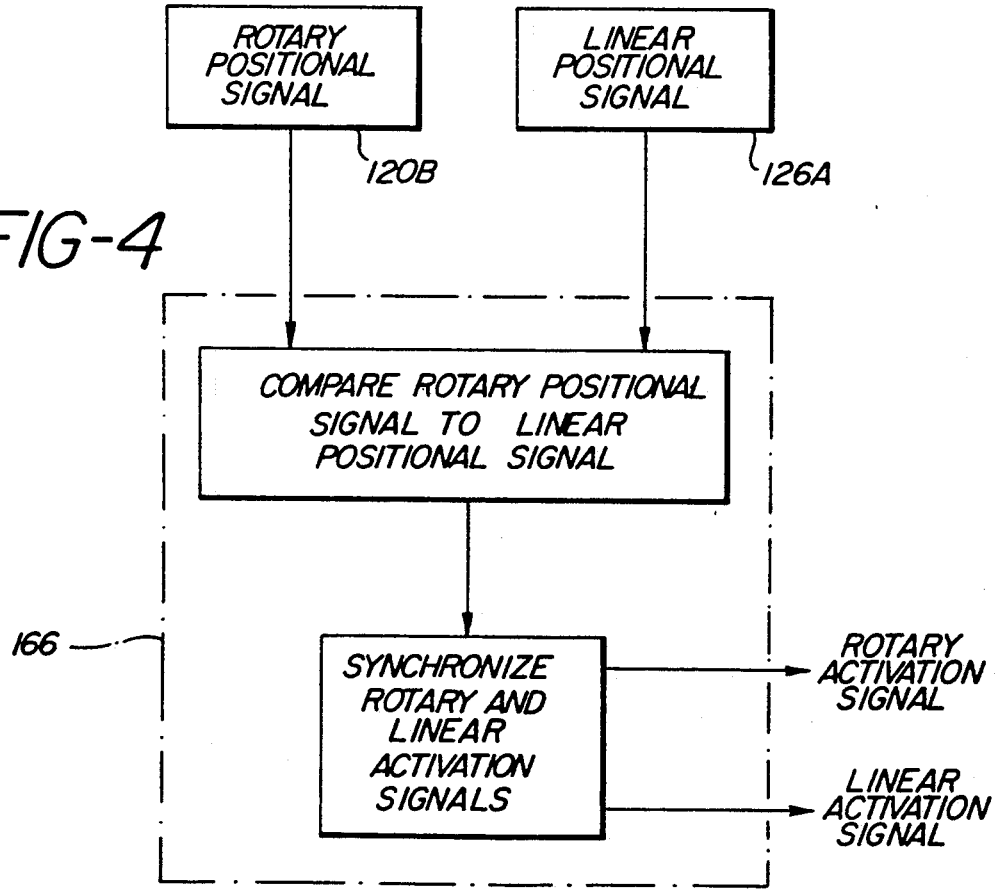
FIG. 4 is a block diagram of means for synchronizing the rotary and linear movement within the beam sweeping apparatus of the present invention.

The synchronization of the rotary actuator 120 and the linear actuator 124 can be software controlled by using one of a variety of motion sensors, such as position sensors 120B and 126A shown in FIG. 1, to monitor the positions of the actuators 120, 124. As shown in FIG. 4, a microprocessor 166 monitors and compares the position signals and delays the activation signal to one or the other of the actuators 120, 124 to synchronize the actuators 120, 124. The synchronization operation can be performed once every minute or every X minutes or can be performed as required based on a specified drift range for the actuators 120, 124.

The apparatus of FIGS. 1 and 2 is operable in accordance with the method of the present invention for operating a laser scanner wherein a laser beam is directed along a path upon a scanner mirror which sweeps the beam onto reflecting means to project a scanning pattern for each sweep of the beam. The method comprises the steps of mounting the scanner mirror on a linear drive system, and linearly moving the scanner mirror generally along the path of the laser beam to vary the point of focus of the laser beam and thereby expand the effective depth of field of the laser scanner. The method may further comprise the step of resiliently biasing the scanner mirror to a linear home position along the linear drive system. When the scanner mirror is mounted upon a rotary drive system for rotating the scanner mirror to sweep the laser beam onto the reflecting means, the method may further comprise the steps of reciprocally pivoting the scanner mirror, and resiliently biasing the scanner mirror to a home position on the rotary drive system. Preferably, the method further comprises the step of synchronizing the pivotal movement of the scanner mirror with the linear movement of the scanner mirror to minimize variations in the point of focus of the laser beam and the scan geometry of the laser scanner during each sweep of the laser beam.

Having thus described the method and apparatus for sweeping a laser beam in a laser scanner of the present invention in detail and by reference to preferred embodiments thereof, it will be apparent that modifications and variations are possible without departing from the scope of the invention defined in the appended claims.

What is claimed is:

1. Beam sweeping apparatus for use in a laser scanner to receive a laser beam traveling along a path from a laser beam generating means and sweep the laser beam onto reflecting means which projects a scanning pattern beyond the laser scanner for each sweep of said laser beam, said beam sweeping apparatus comprising:

mirror means for receiving and directing said laser beam onto said reflecting means;

rotary drive means for supporting and rotating said mirror means to sweep said laser beam onto said reflecting means; and linear drive means for supporting and linearly moving said rotary drive means generally along the path of said laser beam to vary the point of focus of said laser beam along its projected direction beyond the laser scanner and thereby expand the effective depth of field of the laser scanner.

2. Beam sweeping apparatus as claimed in claim 1 wherein said mirror means comprises a multi-faceted mirror head and said rotary drive means comprises a motor having a rotatable output shaft for supporting said mirror head.

3. Beam sweeping apparatus as claimed in claim 2 wherein said linear drive means comprises:
a base defining at least one linear guide member;
an electrical coil supported upon said base and having a central axis spaced in parallel from said guide member; and
a plunger supporting at least one permanent magnet and surrounding said coil, said plunger being supported for linear movement along said at least one linear guide member.

4. Beam sweeping apparatus as claimed in claim 3 wherein said linear drive means further comprises resilient means supported upon said at least one linear guide member for biasing said plunger to a linear home position relative to said at least one linear guide member.

5. Beam sweeping apparatus as claimed in claim 4 wherein said resilient means comprises at least one pair of compression springs positioned on opposite sides of said plunger.

6. Beam sweeping apparatus as claimed in claim 5 further comprising synchronization means for synchronizing the operation of said linear drive means and said motor to minimize variations in the point of focus of said laser beam and the scan geometry of said laser scanner during each sweep of said laser beam.

7. Beam sweeping apparatus as claimed in claim 1 wherein said mirror means comprises at least one mirror surface and said rotary drive means comprises a reciprocally pivoting rotary actuator.

8. Beam sweeping apparatus as claimed in claim 7 wherein said rotary actuator comprises a core shaft extending from said linear actuator, an electrical coil wound around said core shaft, a cylindrical body surrounding said coil and supporting said mirror means and at least one permanent magnet operable with said coil, and bearing means for freely rotatably supporting said cylindrical body on said core shaft.

9. Beam sweeping apparatus as claimed in claim 8 further comprising resilient means for biasing said cylindrical body to a rotary home position relative to said core shaft.

10. Beam sweeping apparatus as claimed in claim 9 wherein said resilient means comprises a torsion spring coupled between said cylindrical body and said core shaft.

11. Beam sweeping apparatus as claimed in claim 10 wherein said linear drive means comprises:
a base defining at least one linear guide member;
an electrical coil supported upon said base and having a central axis spaced in parallel from said guide member; and
a plunger supporting at least one permanent magnet and surrounding said coil, said plunger being supported for linear movement along said at least one linear guide member.

12. Beam sweeping apparatus as claimed in claim 11 wherein said linear drive means further comprises resilient means supported upon said at least one linear guide member for biasing said plunger to a linear home position relative to said at least one linear guide member.

13. Beam sweeping apparatus as claimed in claim 12 wherein said resilient means comprises at least one pair of compression springs positioned on opposite sides of said plunger.

14. Beam sweeping apparatus as claimed in claim 13 further comprising synchronization means for synchronizing the operation of said rotary drive means and said linear drive means to minimize variations in the point of focus of said laser beam and the scan geometry of said laser scanner during each sweep of said laser beam.

15. A method of operating a laser scanner wherein a laser beam is directed along a path upon a scanner mirror which sweeps the beam onto reflecting means to project a scanning pattern beyond the laser scanner for each sweep of the beam, said method comprising the steps of:
mounting said scanner mirror on a linear drive system; and
linearly moving said scanner mirror generally along the path of said laser beam to vary the point of focus of said laser beam along its projected direction beyond the laser scanner and thereby expand the effective depth of field of the laser scanner.

16. A method of operating a laser scanner as claimed in claim 15 further comprising the step of resiliently biasing said scanner mirror to a linear home position along said linear drive system.

17. A method of operating a laser scanner as claimed in 16 wherein said scanner mirror is mounted upon a rotary drive system for rotating said scanner mirror to sweep said laser beam onto said reflecting means further comprising the steps of:
reciprocally pivoting said scanner mirror; and
resiliently biasing said scanner mirror to a home position on said rotary drive system.

18. A method of operating a laser scanner as claimed in 17 further comprising the step of synchronously operating the pivotal movement of said scanner mirror with the linear movement of said scanner mirror to minimize variations in the point of focus of said laser beam and the scan geometry of said laser scanner during each sweep of said laser beam.

* * * * *